R. E. WOODSON.
NUT LOCK.
APPLICATION FILED AUG. 31, 1911.
1,026,138.
Patented May 14, 1912.
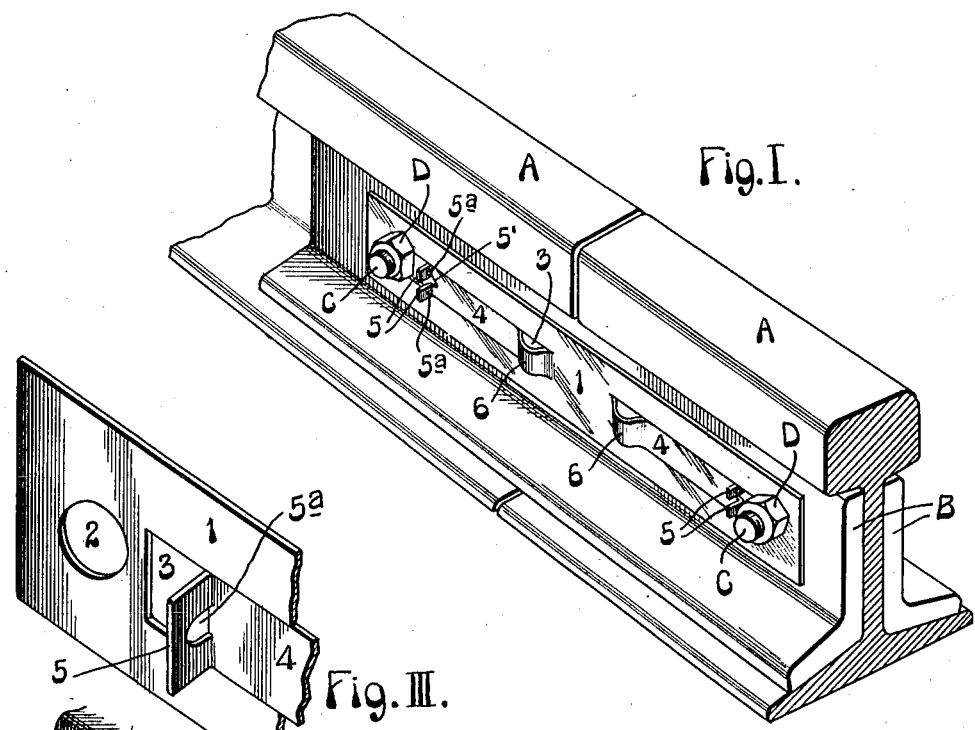
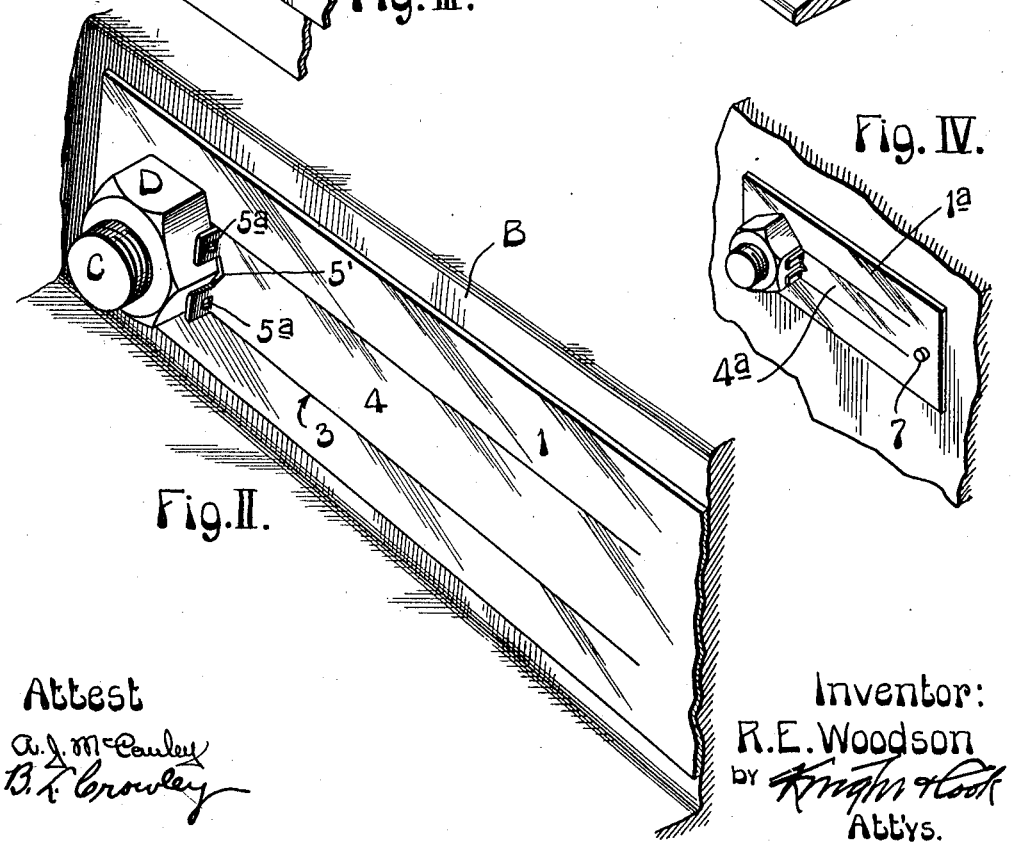
Attest
A. J. McCauley
B. L. Crowley
Inventor:
R. E. Woodson
by Knight & Cook
Attys.

UNITED STATES PATENT OFFICE.

ROBERT E. WOODSON, OF ST. LOUIS, MISSOURI.

NUT-LOCK.

1,026,138.  Specification of Letters Patent.  Patented May 14, 1912.

Application filed August 31, 1911. Serial No. 647,029.

*To all whom it may concern:*

Be it known that I, ROBERT E. WOODSON, a citizen of the United States of America, residing at St. Louis, Missouri, have invented certain new and useful Improvements in Nut-Locks, of which the following is a full, clear, and exact description, reference being had to the accompanying drawings, forming part of this specification.

My invention relates to a nut lock designed more particularly for use in holding the nuts upon bolts used in connecting railway rails, but may be used to hold nuts on bolts employed in other connections.

Figure I is a perspective view of my nut lock as used in connection with the nuts or bolts connecting two railway rails, the parts being shown as they appear after the nuts have been applied to the bolts and before the locking members have been set. Fig. II is an enlarged perspective view of a portion of my improved nut lock and a nut secured thereby, the locking member being shown in set position and the nut being shown with one of its corners presented to the locking member as compared with the flat faces of the nuts that are presented to the locking members in Fig. I. Fig. III is an enlarged perspective view of an end portion of the nut lock and illustrates a slightly modified form of locking member. Fig. IV is a perspective view of a nut lock made in accordance with my improvement and by which a single nut may be held from turning as compared with the provision for the holding of two nuts, as illustrated in Fig. I.

In the accompanying drawings, I have shown my nut lock applied to the nuts or bolts passing through railway rails, and I shall describe it as so used, although it is obvious that it may be used to lock nuts in many other instances.

In the drawings, A designates railway rails and B fish plates fitted thereto, these parts being connected by bolts C provided with nuts D.

1 designates my nut locking plate which in its preferred form is so constructed and equipped as to provide for its service in holding two nuts spaced apart from each other as illustrated in Fig. I. The plate is provided with bolt holes 2 (see Fig. III) and with slots 3 extending longitudinally thereof, one end of each slot being preferably located near one of the bolt holes in the plate.

4 designates the tongues that are cut from the plate 1 thereby producing the slots 3. These tongues are disconnected from the plate at their ends nearest the bolt holes 2 and consequently nearest the nuts applied to bolts extending through said bolt holes. The opposite ends of the tongues are integral with the plate while the main bodies of the tongues always lie within the slots 3 and are held from edgewise movement by the walls of said slots. The tongues are provided at their free ends with outturned lips 5 adapted to engage or abut against the nuts when presented thereto, such engagement or abutment being possible due to the extension of the lips beyond the plane of the plate 1 against which the nuts seat.

When my nut lock is originally manufactured the tongues 4 are provided with humps or bows 6 that jut outwardly from the plane of the plate 1 and the planes of the main portions of the bodies of the tongues 4, as seen in Fig. I, thereby shortening the distance between the fixed and free ends of the tongues. By reason of this shortening of the distance between the fixed and free ends of the tongues, the free ends of the tongues are sufficiently separated from the nuts that are applied to the bolts extending through the bolt holes 2 in the nut lock plate to permit the ready application and turning of the nuts to the desired degree before locking them. The nuts may then be secured by the simple act of flattening the humps 6 of the tongues 4 whereby the portions of the tongues entering into the humps are straightened out and caused to occupy the slots 3 in the plate 1 together with the remainders of the bodies of the tongues. When the actions referred to have taken place, the lips at the free ends of the tongues are so presented to the nuts as to firmly hold the latter from turning on the bolts to which they are applied and the holding action thus provided is rendered very positive for the reason that the tongues being straight from end to end are capable of resisting any endwise pressure thereagainst and being confined between the walls of the slot they are held from movement transversely of the plate 1.

To render the nut locking tongues 4 of suitable shape at their free ends to abut against the flat sides of nuts or to engage the corners of nuts, as may be desired, according to the positions to which the nuts have been turned, I preferably slot the free ends of the tongues as seen at 5', and by so doing I furnish the tongues with recesses into which the corners of the nuts may enter as seen in Fig. II, while retaining the lips 5 that may abut against the flat sides of the nuts when there is occasion for such abutment. The slots at the free ends of the tongues may, however, be dispensed with, and the lips be produced in the form I have shown in Fig. III.

To permit of the separation of the nut locking tongues from the nuts that have been secured thereby, in the event that such separation should be desired at any time, I provide the lips of these tongues with perforations 5ª into which any suitable implement may be introduced for the purpose of drawing the tongues outwardly and backwardly away from the nuts.

In Fig. IV I have shown a locking plate 1ª provided with a single locking tongue 4ª. The locking plate and tongue here shown are similar to one half of the device illustrated in Fig. I, and the illustration is furnished for the purpose of showing the utility of my improvement in locking a single nut. In such an instance, it is necessary to provide some means for holding the plate 1ª from turning and a pin 7 or other suitable device may be employed for this purpose.

I claim:

1. A nut lock comprising a plate provided with a slot and having a nut engaging tongue located in said slot, the said tongue being provided with a hump adapted to be straightened out to present the tongue to the nut to be held thereby.

2. A nut lock comprising a plate provided with a slot and having a nut engaging tongue located in said slot and provided with a free end having an outturned lip, the said tongue being provided with a hump adapted to be straightened out to present the free end of the tongue to the nut to be held thereby.

3. A nut lock comprising a plate provided with a bolt hole and a slot and having a nut engaging tongue located in said slot, the tongue being connected to the plate at its end farthest removed from said bolt hole and having a free end near said bolt hole, the tongue being provided with a hump adapted to be straightened out to present the free end of the tongue to a nut on a bolt extending through said bolt hole.

4. A nut lock comprising a plate provided with a slot and having a nut engaging tongue located in said slot, the said tongue having a free end containing a notch and being provided with a hump adapted to be straightened out to present the tongue to the nut to be held thereby.

R. E. WOODSON.

In the presence of—
B. L. CROWLEY,
A. J. McCAULEY.